United States Patent

Clements

(10) Patent No.: US 7,983,541 B2
(45) Date of Patent: Jul. 19, 2011

(54) HEAT EXCHANGER PERFORMANCE

(75) Inventor: Martin A. Clements, North Royalton, OH (US)

(73) Assignee: Eaton Industrial Corporation, Cleveland, OH (US)

( * ) Notice: Subject to any disclaimer, the term of this patent is extended or adjusted under 35 U.S.C. 154(b) by 954 days.

(21) Appl. No.: 11/630,815

(22) PCT Filed: Jun. 21, 2005

(86) PCT No.: PCT/US2005/021656
§ 371 (c)(1),
(2), (4) Date: Dec. 27, 2006

(87) PCT Pub. No.: WO2006/085943
PCT Pub. Date: Aug. 17, 2006

(65) Prior Publication Data
US 2007/0189740 A1    Aug. 16, 2007

Related U.S. Application Data

(60) Provisional application No. 60/584,235, filed on Jun. 30, 2004.

(51) Int. Cl.
*F24H 1/08* (2006.01)
(52) U.S. Cl. .................................. 392/471; 60/39.08
(58) Field of Classification Search ........... 392/471; 60/39.08
See application file for complete search history.

(56) References Cited

U.S. PATENT DOCUMENTS

| | | | |
|---|---|---|---|
| 2,865,442 A | | 12/1958 | Halford et al. |
| 2,986,003 A | | 5/1961 | Buckingham |
| 3,080,716 A | * | 3/1963 | Cummings et al. .............. 60/736 |
| 3,300,965 A | * | 1/1967 | Sherlaw et al. .............. 60/39.08 |
| 3,382,672 A | * | 5/1968 | French .......................... 60/39.281 |
| 3,779,007 A | * | 12/1973 | Lavash .......................... 60/39.281 |
| 4,020,632 A | * | 5/1977 | Coffinberry et al. ............ 60/773 |
| 4,041,697 A | | 8/1977 | Coffinberry et al. |
| 4,104,873 A | * | 8/1978 | Coffinberry ................... 60/39.281 |
| 4,354,345 A | * | 10/1982 | Dreisbach et al. ............ 60/39.08 |
| 4,696,156 A | * | 9/1987 | Burr et al. ..................... 60/39.08 |
| 5,203,174 A | * | 4/1993 | Meyer ............................ 60/736 |
| 5,495,715 A | * | 3/1996 | Loxley ........................... 60/734 |

FOREIGN PATENT DOCUMENTS

| | | |
|---|---|---|
| GB | 760 243 | 10/1956 |
| GB | 763 449 | 12/1956 |
| GB | 1 090 494 A | 11/1967 |
| GB | 2 282 186 A | 3/1995 |

OTHER PUBLICATIONS

EP 05 85 7463 Supplementary European Search Report, mailed Nov. 25, 2010.

* cited by examiner

*Primary Examiner* — Thor S Campbell
(74) *Attorney, Agent, or Firm* — Fay Sharpe LLP

(57) ABSTRACT

The present invention provides a heat exchange system for a closed loop fuel delivery system. The heat exchange system generally includes a first pump, a heat exchanger, a high pressure pump pressurizes fuel. The heat exchanger, which is located downstream of the first pump, receives the pressurized fuel flow. The high pressure pump, which is located downstream of the heat exchanger, delivers a predetermined amount of fuel flow to a jet engine. The circulating pump receives fuel flow downstream of the heat exchanger and recirculates the fuel flow upstream of the heat exchanger.

21 Claims, 2 Drawing Sheets

HEAT EXCHANGER PERFORMANCE

CROSS REFERENCE TO RELATED APPLICATIONS

This application claims the benefit of PCT Patent Application Serial No. PCT/US2005/021656, filed on 21 Jun. 2005, and claims the benefit of U.S. Provisional Application No. 60/584,235, filed on 30 Jun. 2004, the disclosures of which are incorporated herein by reference.

BACKGROUND OF THE INVENTION

The present invention generally relates to a heat exchange system for a fuel delivery system. It finds particular application in conjunction with modern jet aircraft turbine engines and will be described with particular reference thereto. However, it is to be appreciated that the present exemplary embodiments are also amenable to other applications.

Modern jet engine fuel systems utilize a variety of fuel/oil (liquid-to-liquid) heat exchangers to both cool engine and electrical generator lubricating oil, and heat (or cool) portions of the fuel used by the engine as burn flow or for actuation purposes. Typically two fundamental approaches are used in the thermal management of the engine's fluids with regard to heat exchangers to obtain the maximum heat exchange performance with the minimum heat exchanger size. The first approach aims at providing the maximum differential temperature between the two heat exchange medias (i.e. fuel and oil). The second approach aims at providing the maximum amount of flow through the heat exchanger. Both of these approaches work to minimize the physical size and weight of the heat exchanger.

Fundamentally, heat transfer in a heat exchanger follows a relationship that depends on the two major factors as alluded to above. These factors are exchange fluid temperature difference (hereafter $\Delta T$) and a heat transfer coefficient that is highly dependent upon the amount of fluid flow through the heat exchanger. In the typical jet engine application, the two fundamental drivers in heat transfer are not maximized together. That is, maximum $\Delta T$ and higher fluid flow rates generally do not accompany one another.

Accordingly, there is a need for an improved heat exchange system for a delivery system for a jet aircraft turbine engine which provides both a maximum $\Delta T$ and higher fluid flow rates.

BRIEF DESCRIPTION OF THE INVENTION

The present invention generally relates to a new and improved heat exchange system for a jet aircraft turbine engine.

According to one aspect of the present invention, a heat exchange system for a closed loop fuel delivery system is provided. The heat exchange system generally includes a first pump, a heat exchanger, a high pressure pump and a circulating pump. The first pump pressurizes fuel. The heat exchanger, which is located downstream of the first pump, receives the pressurized fuel flow. The high pressure pump, which is located downstream of the heat exchanger, delivers a predetermined amount of fuel flow to a jet engine. The circulating pump receives fuel flow downstream of the heat exchanger and recirculates a portion of the fuel flow to a location upstream of the heat exchanger.

According to another aspect of the present invention, a heat exchange system for maximizing efficiency of a heat exchanger of a jet engine is provided. The heat system includes a first pump for delivering pressurized fuel and a heat exchanger which receives fuel flow from the first pump. A high pressure pump receives fuel flow from the heat exchanger. A circulating pump receives fuel flow from downstream of the heat exchanger and recirculates a portion of the fuel flow through the heat exchanger.

According to yet another aspect of the present invention, a method of increasing fuel flow through a heat exchanger of a fuel delivery system of a jet engine by using a circulating pump for increasing fluid temperature difference is provided. The method generally comprises the steps of first pressurizing fuel through a first pump and directing the pressurized fuel to a heat exchanger. A portion of the fuel from the heat exchanger is directed to a high pressure pump and a portion of the fuel from the heat exchanger is recirculated through a circulating pump. The fuel exiting from the circulating pump is directed to the heat exchanger.

A benefit of the present invention is the ability to increase the flow of fuel through the heat exchanger which, in turn, provides both a maximum $\Delta T$ and higher fluid flow rates.

Another benefit of the present invention is the ability to maximize heat exchanger efficiency and minimize heat exchanger size and weight by incorporating the circulating pump in the heat exchange system.

Still other benefits and aspects of the invention will become apparent from a reading and understanding of the detailed description of the embodiments hereinbelow.

BRIEF DESCRIPTION OF THE DRAWINGS

The present invention may take physical form in certain parts and arrangements of parts, embodiments of which will be described in detail in this specification and illustrated in the accompanying drawings which form a part of the invention.

DETAILED DESCRIPTION OF THE INVENTION

It should, of course, be understood that the description and drawings herein are merely illustrative and that various modifications and changes can be made in the structures disclosed without departing from the spirit of the invention. Like numerals refer to like parts throughout the several views. It will also be appreciated that the various identified components of the heat exchange system of the present invention are merely terms of art that may vary from one turbine engine or manufacturer to another and should not be deemed to limit the present invention.

Figure 1:
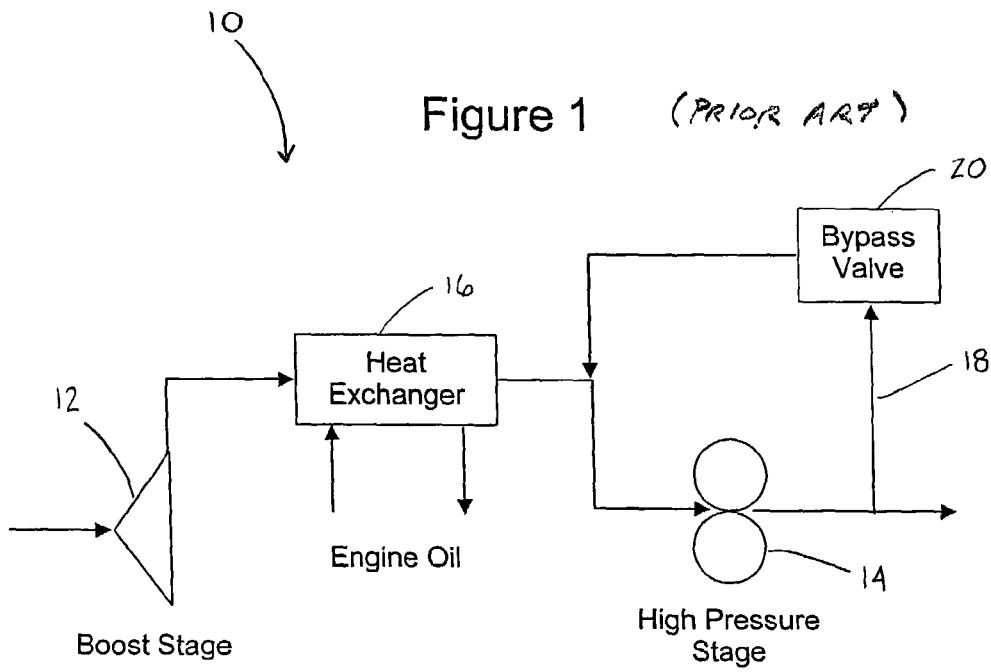
FIG. 1 is a simplified schematic of a first conventional heat exchange system for a jet aircraft turbine engine.

A first conventional heat exchange system 10 is schematically illustrated in FIG. 1. In this system, fuel typically enters into a first pump 12, generally a centrifugal pump, from an airframe supply line. The centrifugal pump, sometimes referred to as a boost stage, delivers pressurized fuel flow to feed the high pressure pump 14. Fuel passes from the boost stage through a fuel/oil heat exchanger 16 prior to entering the high pressure pumping stage. The high pressure pumping stage is shown as a fixed displacement pump that delivers a fixed amount of flow dependent on pump drive speed. Alternatively, the high pressure pumping stage can be a variable displacement pump. The high-pressure stage output flow is then permitted to travel in three paths. These paths are generally actuation flow (not shown), metered flow (not shown), and bypass flow 18.

Generally, actuation flow is flow provided to system hydraulic type actuators that are used to control aspects of the jet engine such as variable geometry and bleed valves that improve engine performance over its wide operating range. The heat exchanger 16 acts to ensure that fuel used for actuation or metering purposes is sufficiently heated in order to avoid ice build up and subsequent failure of engine systems under certain flight conditions. Metered flow is that flow that is sent to and burned in the engine combustor to produce power. Bypass flow 18 is the remaining portion of high pressure pump output flow that is unused for actuation and metered flow. The bypass flow is returned through a bypass valve 20 to an inlet of the high pressure pumping stage 14.

The first typical jet engine thermal management solution shown in FIG. 1 strives to maximize the exchange fluid media (fuel/oil) temperature difference (hereafter ΔT). In order to maximize the ΔT, the heat exchanger 16 is placed in the forward part of the fuel system 10, so as to exchange oil heat to the fuel where the fuel temperatures are typically lower. However, by locating the heat exchanger at the forward location, only metered flow can be passed through the heat exchanger. Under many operating conditions, such as cruise and idle descent, metered flow is quite low as compared to the required system heat transfer. Thus, although the heat exchange system of FIG. 1 has a high ΔT, the low flow through the heat exchanger 16 leads to a relatively inefficient heat exchanger (lower effectiveness) which causes the heat exchanger size to be increased.

Figure 2:
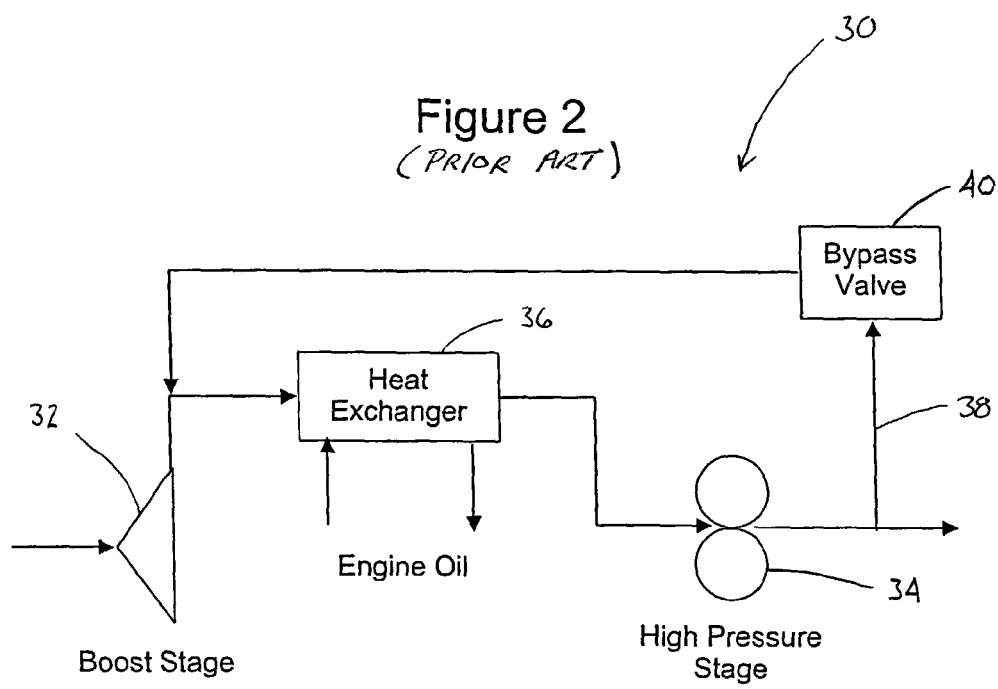
FIG. 2 is a simplified schematic of a second conventional heat exchange system for a jet aircraft turbine engine.

A second conventional heat exchange system 30 is schematically illustrated in FIG. 2. This typical jet engine thermal management solution strives to maximize the fuel flow through the heat exchanger 36 so as to increase the heat transfer coefficient. Similar to the first conventional heat exchange system 10, fuel generally enters into a centrifugal pump or boost stage 32 from an airframe supply line. The centrifugal pump delivers pressurized fuel flow to feed a high pressure pump 34. Fuel passes from the boost stage through a fuel/oil heat exchanger 36 prior to entering the high pressure pumping stage 34. In this system, bypass flow through line or passage 38 is returned through a bypass valve 40 to an inlet of the heat exchanger 36.

In order to maximize the fuel flow in the second conventional heat exchange system 30, the heat exchanger 36 is placed such that high pressure stage flow from pump stage 34 passes through the heat exchanger 36. High pressure stage flow is typically much greater than engine burn flow (typically 5 to 10 times as much at cruise and idle descent). This additional flow is helpful in increasing the effectiveness (efficiency) of the heat exchanger 36. However, since this second conventional heat exchange system 30 bypasses unused high pressure pump 34 stage flow to the inlet of the heat exchanger 36 (thereby increasing the flow rate through the heat exchanger), the temperature of the fuel passing through the heat exchanger is greatly elevated relative to the first conventional heat exchange system 10 illustrated in FIG. 1. Thus, the heat exchange system 30 of FIG. 2 has a low ΔT.

Overall, both the first conventional heat exchange system 10 and the second conventional heat exchange system 30 offer similar overall efficiency in jet engine thermal management systems in terms of heat exchanger size and weight. As noted above, however, prior systems have failed to capitalize on maximizing the heat exchange efficiencies of both the high ΔT (FIG. 1) and the increased heat exchange offered by increased flow (FIG. 2).

Figure 3:
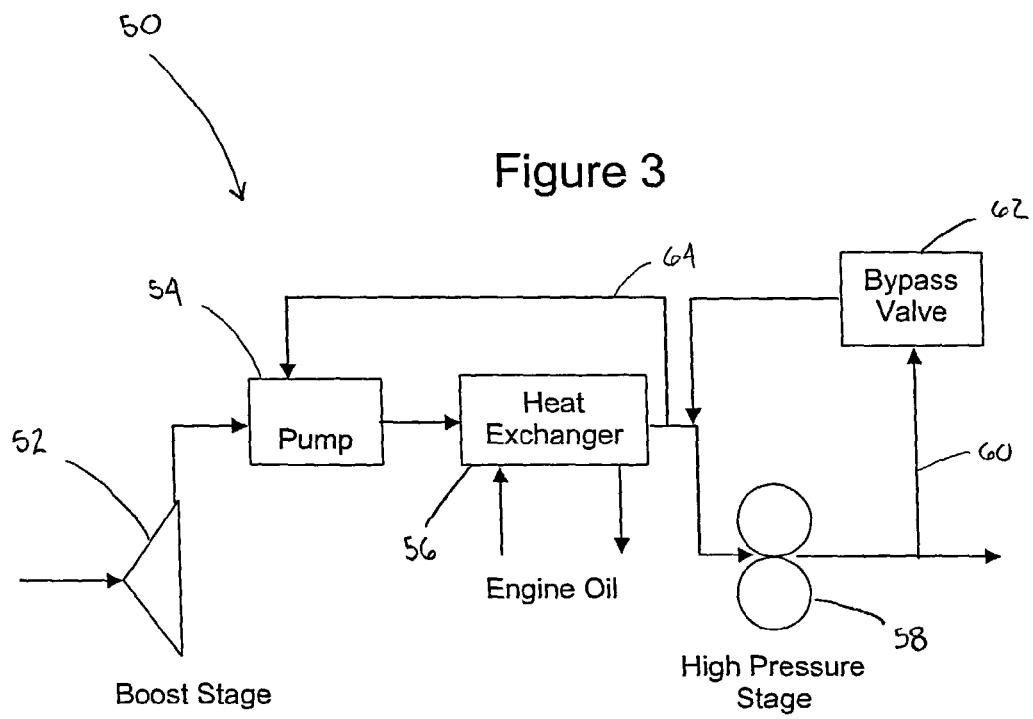
FIG. 3 is a simplified schematic of a heat exchange system for a jet aircraft turbine engine according to a first embodiment of the present invention.

FIG. 3 schematically illustrates a heat exchange system 50 according to a first embodiment of the present invention that offers a solution to this issue. Again, fuel is inlet to a first pump 52 (i.e., boost stage), generally a centrifugal pump, from an airframe supply line. The centrifugal pump pressurizes the fuel in a conventional means. The pressurized fuel then passes from the boost stage through a circulating pump 54 and a heat exchanger 56 before being input to a high pressure pump 58. The high pressure pump delivers a predetermined amount of the fuel flow to a jet engine as is known in the art. Similar to the conventional heat exchange systems, the high pressure pump can be a fixed displacement pump that delivers a fixed amount of flow dependent on pump drive speed or a variable displacement pump, such as the high pressure pump described in co-pending PCT/US application Serial No. PCT/US02/09298, filed Mar. 27, 2002, which is incorporated herein by reference. However, it will be understood that still other pumps may be used without departing from the scope and intent of the present invention. In this embodiment, bypass flow 60 is recirculated through a bypass valve 62 upstream of the high pressure pumping stage 58.

In the heat exchange system 50 of FIG. 3, the heat exchanger 56 is placed in the forward part of the fuel system in order to maximize the ΔT. Again, at the forward location, only engine burn flow is passed through the heat exchanger. To compensate for this low flow through the heat exchanger 56, the heat exchange system 50 provides a path 64 downstream of the heat exchanger which directs a portion of the fuel flow exiting the heat exchanger upstream of the heat exchanger to an inlet of the circulating pump 54. The circulating pump then delivers the bypassed fuel through the heat exchanger. By adding the circulating pump into the heat exchange system 50, additional flow passes through the heat exchanger 56 which maximizes the heat exchanger performance. The portion of fuel flow redirected from downstream of the heat exchanger is added to the pressurized fuel from the boost stage 52 thereby increasing the flow of fuel through the heat exchanger which, in turn, increases the heat transfer coefficient. When compared to the first conventional heat exchange system 10 and the second conventional heat exchange system 30, it is calculated that the heat exchange system 50 of FIG. 3 will realize about a 20% improvement in heat transfer capabilities.

Figure 4:
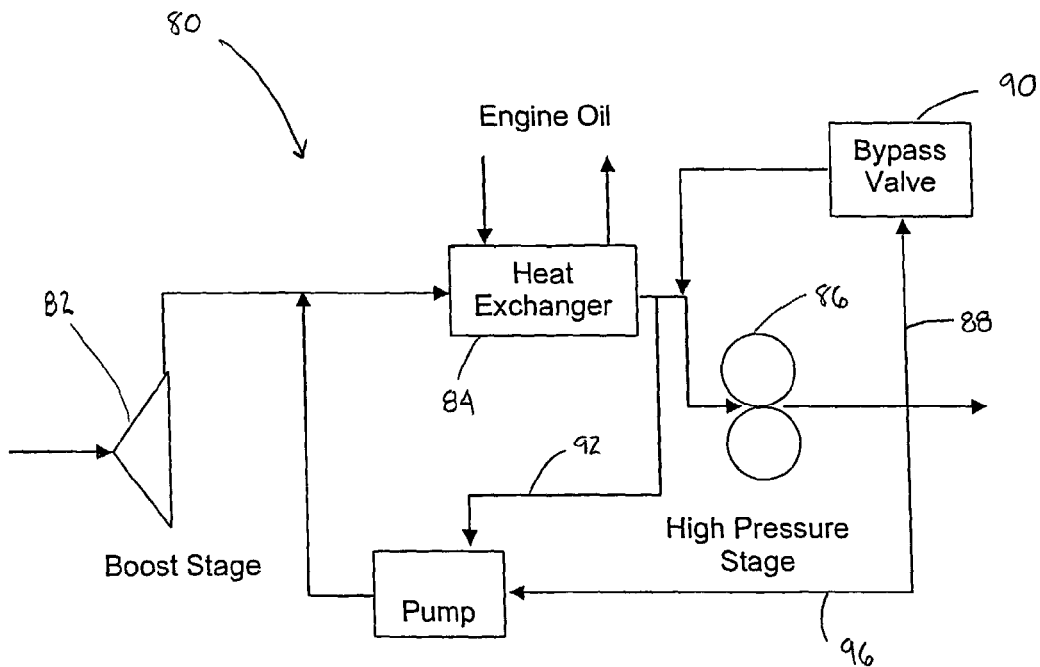
FIG. 4 is a simplified schematic of a heat exchange system for a jet aircraft turbine engine according to a second embodiment of the present invention.

FIG. 4 schematically illustrates a heat exchange system 80 according to a second embodiment of the present invention. Again, fuel is inlet to a first pump 82, such as a centrifugal pump. The pressurized fuel then passes from the first pump through a heat exchanger 84 before being input to a high pressure pump 86. In this embodiment, bypass flow 88 is returned through a bypass valve 90 which recirculates a first portion of fuel flow exiting from the high pressure pump 82 to a location upstream of the high pressure pump.

In the heat exchange system 80 of FIG. 4, the heat exchanger 84 is again placed in the forward part of the fuel system in order to maximize the ΔT. To compensate for this low flow through the heat exchanger, and similar to the first embodiment of FIG. 3, the heat exchange system 80 provides a first path 92 downstream of the heat exchanger which directs a portion of the fuel flow exiting the heat exchanger to an inlet of a circulating pump 94. In addition to this first path 92 which recirculates a portion of the fuel from the heat exchanger to a location upstream of the heat exchanger, a second path 96 is provided which delivers a second portion of the fuel flow downstream of the high pressure pump 82 to the inlet of the circulating pump 94. As illustrated in FIG. 4, the fuel exiting the circulating pump is directed upstream of the heat exchanger. Again, by adding the circulating pump 94 into the heat exchange system, additional flow can go through the heat exchanger 84 which, in turn, increases the heat transfer coefficient. When compared to the first conventional heat exchange system 10 and the second conventional heat exchange system 30, the heat exchange system 80 of FIG. 4 also realizes about a 20% improvement in heat transfer capabilities.

As is evident from the foregoing, the exemplary embodiments of the present invention, schematically illustrated in FIGS. 3 and 4, improve heat exchanger efficiency by utilizing a circulating pump (or a similarly suited device) to motivate an increased amount of heat exchanger flow while maintaining a thermal management system architecture that supports a maximum ΔT location for the heat exchanger. Once located, the circulating pump ensures that the flow of fuel through the heat exchanger is approximately the same as the flow of oil through the heat exchanger, thereby equating the heat capacity (i.e. flow rate times specific heat) of both fluid medias (fuel and oil), and maximizing heat exchanger efficiency. By incorporating the circulating pump in the heat exchange systems 50 and 80, both heat transfer factors (ΔT and heat transfer coefficient) can be better matched to maximize heat exchanger efficiency and minimize heat exchanger size and weight.

The disclosure has been described with reference to the preferred embodiments. Obviously, modifications and alterations will occur to others upon reading and understanding the preceding detailed description. It is intended that the disclosure be construed as including all such modifications and alterations insofar as they come within the scope of the appended claims or the equivalents thereof.

What is claimed is:

1. A heat exchange system for a closed loop fuel delivery system comprising:
   a first pump for pressurizing fuel;
   a heat exchanger located downstream of the first pump for receiving the pressurized fuel flow;
   a high pressure pump located downstream of the heat exchanger, the high pressure pump delivering a predetermined amount of the fuel flow to an associated jet engine; and,
   a circulating pump having a moveable pump member received in a housing for pressurizing fuel between an inlet and outlet thereof, the circulating pump being separate from the high pressure pump for receiving fuel flow downstream of the heat exchanger and recirculating the fuel flow upstream of the heat exchanger.

2. The invention of claim 1 wherein the circulating pump increases flow of fuel through the heat exchanger thereby increasing exchange fluid temperature difference.

3. The invention of claim 1 wherein an outlet of the first pump is in fluid communication with at least one of an inlet of the heat exchanger and an inlet of the circulating pump.

4. The invention of claim 1 wherein an inlet of the circulating pump is downstream of the heat exchanger.

5. The invention of claim 4 wherein an inlet of the circulating pump is in fluid communication with an outlet of the heat exchanger and an outlet of the high pressure pump.

6. The invention of claim 1 wherein an inlet of the circulating pump is upstream of the heat exchanger.

7. The invention of claim 6 wherein the inlet of the circulating pump is in fluid communication with the outlet of the first pump and the outlet of the heat exchanger.

8. The invention of claim 1 further comprising a bypass valve located downstream of the high pressure pump.

9. The invention of claim 8 wherein the bypass valve recirculates a portion of fuel flow exiting from the high pressure pump upstream of the high pressure pump.

10. The invention of claim 1 wherein the high pressure pump is a fixed displacement pump.

11. The invention of claim 1 wherein the high pressure pump is a variable displacement pump.

12. A heat exchange system for maximizing efficiency of a heat exchanger of an associated jet engine comprising:
    a first pump for delivering pressurized fuel;
    a heat exchanger receiving fuel flow from the first pump;
    a high pressure pump receiving fuel flow from the heat exchanger; and,
    a circulating pump receiving fuel flow from downstream of the heat exchanger before the downstream fuel flow reaches an inlet of the high pressure pump and delivering fuel flow through the heat exchanger.

13. The invention of claim 12 wherein an inlet of the circulating pump is in fluid communication with an outlet of the first pump and an outlet of the heat exchanger.

14. The invention of claim 12 wherein the inlet of the circulating pump is in fluid communication with the outlet of the heat exchanger and an outlet of the high pressure pump.

15. The invention of claim 12 wherein the circulating pump increases flow of fuel through the heat exchanger thereby increasing exchange fuel temperature difference.

16. The invention of claim 12 further comprising a bypass valve located downstream of the high pressure pump for delivering fuel flow downstream of the high pressure pump to an inlet of the high pressure pump.

17. The invention of claim 12 wherein a first portion of the fuel flow downstream of the high pressure pump is delivered to the bypass valve and a second portion of the fuel flow downstream of the high pressure pump is delivered to the circulating pump.

18. A method of increasing fuel flow through a heat exchanger of a fuel delivery system of a jet engine by using a circulating pump for increasing fluid temperature difference comprising the steps of:
    pressurizing fuel through a first pump;
    directing the pressurized fuel to a heat exchanger;
    directing a portion of the fuel from the heat exchanger to a high pressure pump;
    pumping a recirculating portion of the fuel from the heat exchanger through a circulating pump separate from the high pressure pump; and,
    directing the fuel exiting from the circulating pump to the heat exchanger.

19. The method of claim 18 comprising the further step of directing a portion of the fuel downstream of the high pressure pump through the circulating pump.

20. The method of claim 18 comprising the further step of bypassing and recirculating a portion of the fuel exiting from the high pressure pump upstream of the high pressure pump.

21. A heat exchange system for a closed loop fuel delivery system comprising:
- a first pump for pressurizing fuel;
- a heat exchanger located downstream of the first pump for receiving the pressurized fuel flow;
- a high pressure pump located downstream of the heat exchanger, the high pressure pump delivering a predetermined amount of the fuel flow to an associated jet engine; and,
- a circulating pump separate from the high pressure pump for receiving fuel flow downstream of the heat exchanger, the circulating pump pumping the fuel flow upstream of the heat exchanger.

* * * * *